INVENTORS
DONALD M. TAYLOR
& PAUL D. MARTZ
BY George R Nimmer
ATTORNEY

June 25, 1968   D. M. TAYLOR ETAL   3,389,686
CHINCHILLA CARE CAGE
Filed March 25, 1966   4 Sheets-Sheet 3
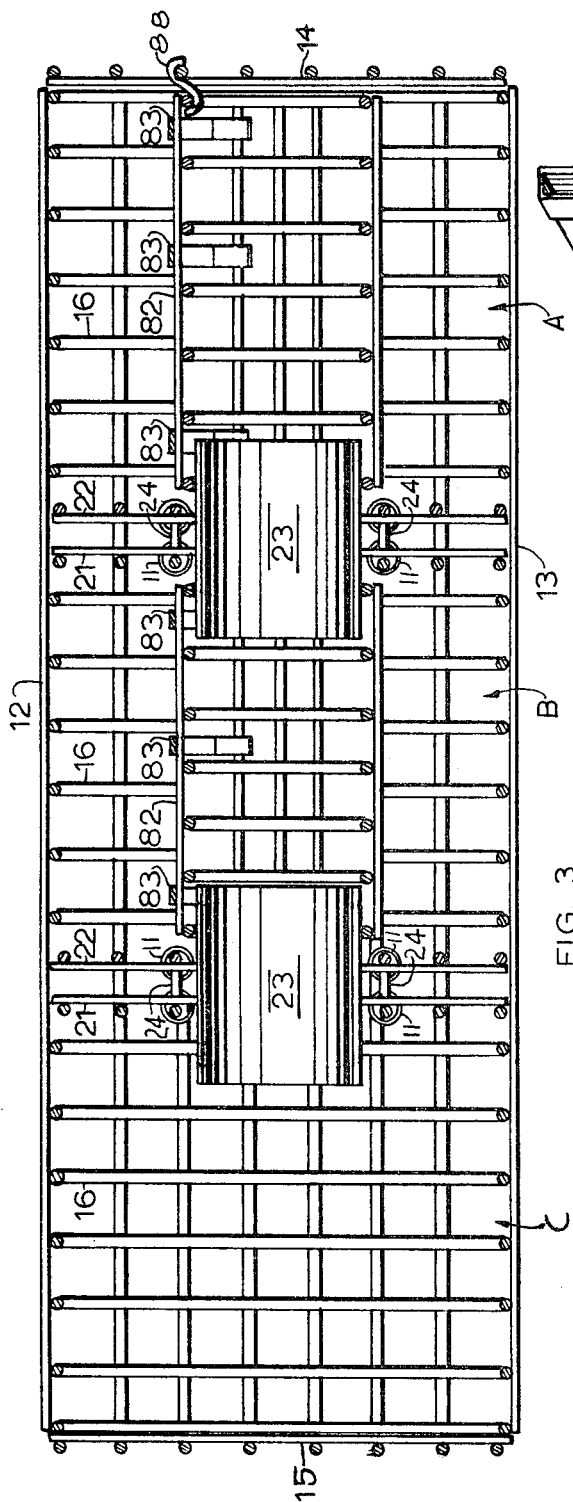
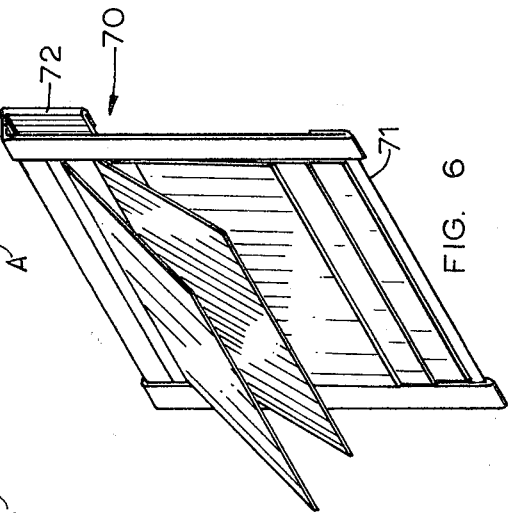
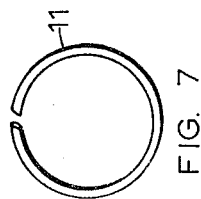
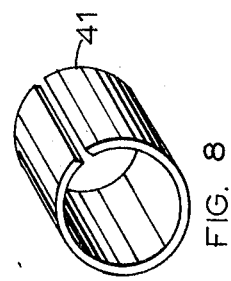
INVENTORS
DONALD M. TAYLOR
& PAUL D. MARTZ
BY George R Nimmer
ATTORNEY June 25, 1968  D. M. TAYLOR ETAL  3,389,686
CHINCHILLA CARE CAGE
Filed March 25, 1966  4 Sheets-Sheet 4
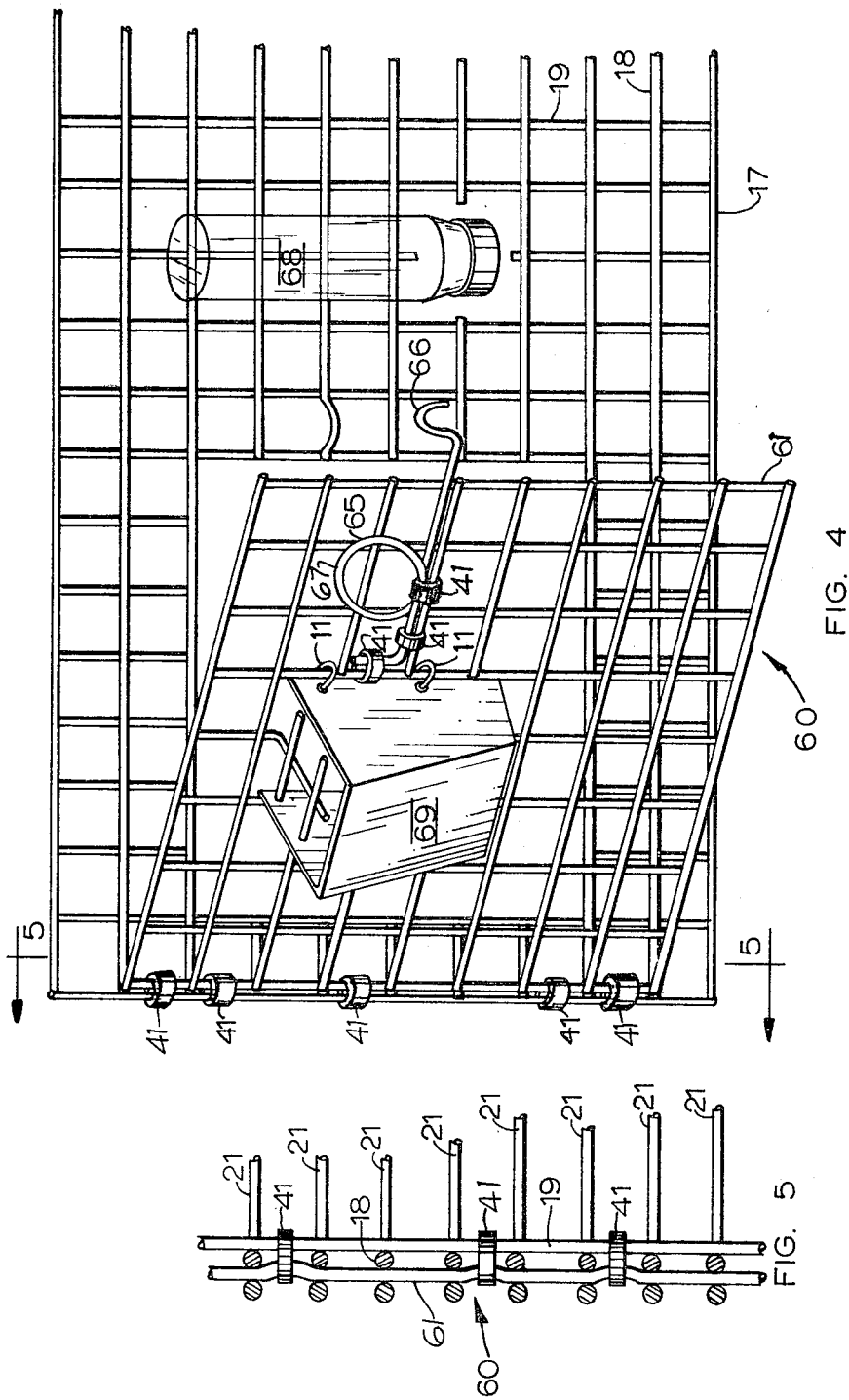
INVENTORS.
DONALD M. TAYLOR & PAUL D. MARTZ
BY George R. Nimmer
ATTORNEY

United States Patent Office 3,389,686
Patented June 25, 1968

3,389,686
CHINCHILLA CARE CAGE
Donald M. Taylor, Council Bluffs, Iowa, and Paul D. Martz, Omaha, Neb., assignors, by mesne assignments, to T & T Chinchilla Inc., Council Bluffs, Iowa, a corporation of Iowa
Filed Mar. 25, 1966, Ser. No. 537,457
9 Claims. (Cl. 119—17)

ABSTRACT OF THE DISCLOSURE

This invention relates to portable multi-compartment cages for small animals, and in particular this invention provides a multi-compartment cage which includes several novel features especially adapted to the care, raising and polygamous breeding of chinchillas. The cage includes dual-panel partitions means having tubular liners positioned within openings provided in the partitions to provide passageway means between the multi-compartments.

---

Chinchillas are commonly raised as a profitable hobby or as a sideline business by homeowners, both in rural and in urban areas. Chinchilla raising lends itself particularly well to a household operation because room temperatures and a moderate degree of individualized care is required for this valuable fur bearing animal. The profit from chinchilla raising is dependent upon the population increase of the owner's herd, the male increase being sold for their pelt and the female increase being retained for further breeding. Normally one male animal is sufficient for the breeding of up to thirty female chinchillas, although a one to seven ratio is generally considered to be near optimum.

Because it has been established that higher rates of and better control of breeding will result when each female chinchilla is segregated within a separate compartment and that profitable chinchilla raising depends upon the sale of all male herd increase except for the very few required for breeding purposes, each female chinchilla and her offspring is normally kept segregated within a single compartment of a multi-compartment box-like elongate cage. There is a continuous conduit system leading into the various compartments of one or more care cages, the male stud being free to roam the continuous conduit system from compartment to compartment to breed with the various segregated female occupants. The conduit systems of the prior art are normally positioned externally to the elongate cages and comprise continuous piping that are expensive to build, install, and maintain.

The female animals are provided with a neck collar assembly having a cross-sectional size greater than that for the conduit to prevent access of any female into the conduit. However, it is not practical to outfit infant animals with such a necessarily bulky collar and for this reason infant chinchillas have a tendency to enter the conduit system and thence into the hostile environment of other compartments. Prior art systems have prevented egress of the infant chinchillas with elaborate and costly barricade systems at the juncture of the conduit system with each cage.

Each compartment of the chinchilla care cage necessarily includes an entry-way for each compartment so that the caretaker may have access to each female animal and her litters, the entry-way being provided with a door of one type or another, usually of the hingably pivotal type. The door must necessarily include some type of locking means to maintain the door securely across the entry-way so as to prevent escape of the animals. If the caretaker should inadvertently neglect to engage the door locking means, it would, of course, be possible for the animal to push against a hingably connected door and escape from the compartment. The prior art does not provide for a means to warn the caretaker that the pivotal door is not affirmatively locked into place across the entry-way opening.

It is accordingly the general object of the present invention to overcome the above mentioned disadvantages and deficiencies of the prior art.

It is yet another object of the present invention to provide a simple and inexpensive conduit system between the several compartments to provide access for the male stud.

It is yet another object of the present invention to provide an improved barricade means for preventing egress of the infant animals into the conduit system and into the hostile environment of neighboring compartments. It is an ancillary object to maintain close physical proximity between the male stud and new mothers so as to promote tranquility of the mother even though the male stud is not able to have direct access to her compartment because of the barricade means designed to prevent egress of the infant animals from their mother's compartment.

It is a further object of the present invention to provide an improved pivotal door construction for the compartment entry-way opening including an improved locking means therefor, said door being inherently adapted to remain partially ajar when not affirmatively locked into position so as to warn the caretaker of this fact.

It is yet another object of the present invention to provide a record keeping device that may be attached to and used in conjunction with a multi-compartment chinchilla care cage or with its supporting rack.

With the above and other objects and advantages in view, which will appear as the description proceeds, this invention resides in the novel construction, combination, and arrangement of parts as hereinafter described and more particularly defined by the appended claims, it being understood that such changes in the precise embodiment of the herein disclosed invention may be made as come within the scope of the claims.

In the drawing, wherein like numbers refer to like parts in the several views, and in which:

FIGURE 3 is a sectional plan view taken along line 3—3 of FIGURE 1.

FIGURE 4 is a perspective detail view of one of the three pivotal door components of the chinchilla care cage.

FIGURE 5 is a sectional view taken along line 5—5 of FIGURE 4.

FIGURE 6 is a perspective view of the record keeping means component of the present invention.

FIGURE 7 is a perspective view of a ring type fastener means employed in the present invention.

FIGURE 8 is a perspective view of a band type fastener means employed in the present invention.

Figure 1:
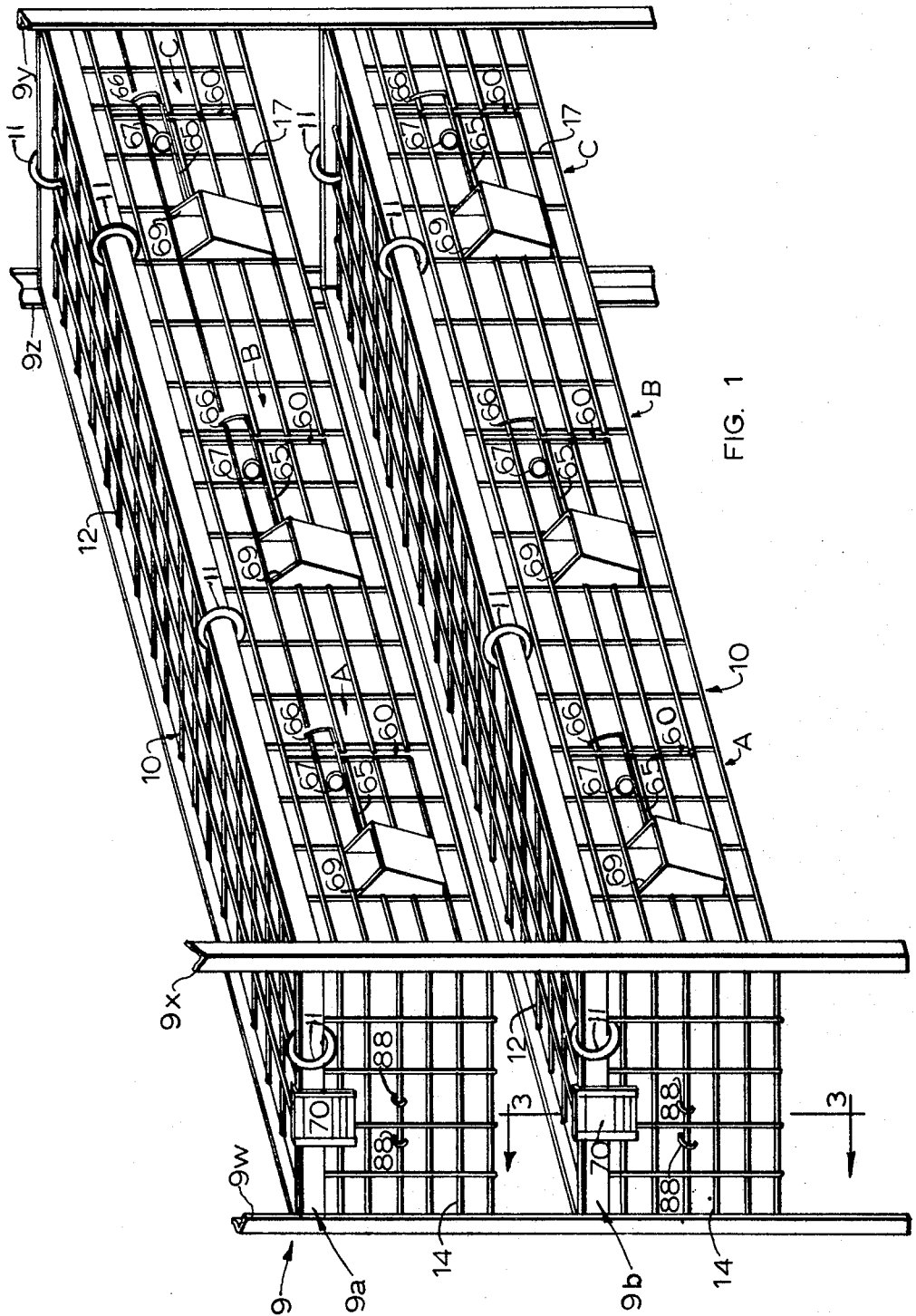
FIGURE 1 is a perspective overall view of a pair of vertically aligned identical chinchilla care cages of the present invention, said care cages being supported within a suitable rack.

As exemplified in the FIGURE 1 overall or general view, chinchilla care cages, e.g. 10, are typically of screen panel construction and assume an elongate box-like configuration divided into a plurality of horizontally aligned compartments, each compartment providing the habitat for one female animal. Because of the commonly employed ratio of seven females to one male for the chinchilla family, the typical care cage has seven compartments connected together with a conduit system. The chinchilla care cage is horizontally supported within a rack member, e.g. 9, said rack comprising a skeletal framework of mutually perpendicular structural beams to provide a plurality of vertically aligned bottomless horizontal shelves. The vertical structural beams 9w, 9x, 9y, and 9z are of L-shaped cross-section so as to stably position rack member 9. Although two bottomless shelves 9a and 9b are shown, vertical members 9w–9z may be extended upwardly a convenient distance to provide space for additional bottomless shelves. The horizontal structural beams of rack 9 are of strap-like bar configuration, and cage 10 is horizontally supported from the underside of each rack shelf as with a plurality of rings 11, each ring encircling a rack member horizontal beam and a portion of the care cage screen panel structural member. A tray (not shown) formed of sheet metal or other moisture impervious material is positioned below the lower screen panel 13 of each care cage 10, and paper or other disposable absorbent material (not shown) is placed upon the tray to collect solid and liquid animal wastes that fall through screen panel 13 of each care cage 10.

The chinchilla care cage 10 of the present invention comprises a plurality of open mesh rectangular screen panels integrally joined together including upper panel 12, lower panel 13, upright end panels 14 and 15, rearward panel 16, forward panel 17, a plurality of dual-panel partitions 20 adapted to support sleeve member 80, and a plurality of pivotably attached doors 60.

Horizontal upper panel 12 and horizontal lower panel 13 are spaced apart in an opposed substantially-parallel vertically-aligned relationship by means of upright panels 14–17. Panels 12 and 13 are each of elongate rectangular shape and of substantially the same dimensional size so that horizontal panels 12 and 13 are conterminous in vertical alignment. Upright end panels 14 and 15 are spaced apart in an opposed substantially-parallel horizontally aligned relationship, said panels 14 and 15 being of substantially the same dimensional size. Upright vertical rearward panel 16 and upright forward panel 17 are also spaced apart in an opposed substantially parallel horizontally aligned relationship, said panels 16 and 17 each being of elongate rectangular shape and of substantially the same dimensional size. A plurality of upright dual-panel partitions 20 are rigidly spaced at regular intervals along and between horizontal panels 12 and 13 to provide a plurality of compartments within care cage 10. The number of compartments does, of course, exceed the number of dual-panel partitions by one, and accordingly the use of two partitions 20 results in three compartments A, B, and C. Forward panel 17 has a plurality of regularly spaced openings, preferably of rectangular shape, to provide an entrance into each compartment. Specifically, upright forward panel 17 has herein three such openings 17a, 17b and 17c, three compartments being shown as a representative embodiment in the drawing.

Figure 2:
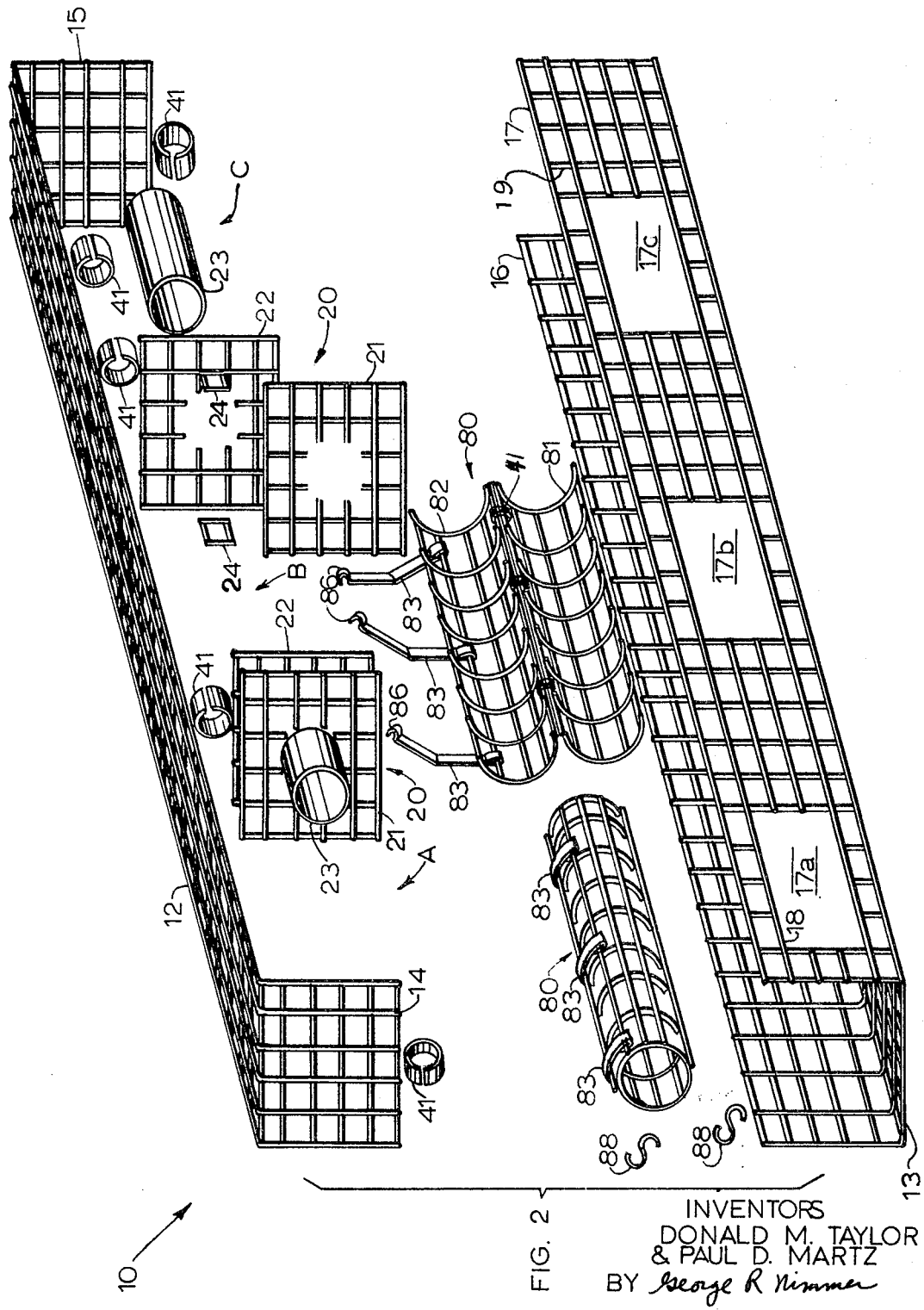
FIGURE 2 is an exploded perspective view of a single chinchilla care cage of the present invention, the three identical pivotal door components being omitted from this view for purposes of clarity.

Certain of the panel members are provided in combination or unitary form from a single rectangular strip of screen material in order to facilitate the manufacturing operation. For example, as illustrated in FIGURE 2, upper panel 12 and end panels 14 and 15 may be provided of a single length of screen material, equal length terminal portions being bent perpendicularly downwardly of the longer intermediate portion to provide the end panels. Similarly, the lower panel 13, rearward panel 16, and forward panel 17 may also be provided of a single length of screen material, equal length terminal portions being bent perpendicularly upwardly to provide the upright rearward and forward panels. The two pieces of appropriately bent rectangular screen are attached together in the appropriate box-like relationship with appropriate fastener means, as for example with a plurality of bands 41. In an equivalent alternative manner, the upper panel 12, rearward panel 16, and forward panel 17 could be provided of single rectangular length of screen material while lower panel 13, and upright end panels 14 and 15 could be provided of a single elongate rectangular length of a screen material.

For the purposes of this patent application, the term "ring 11" is defined to mean an annular fastener resulting from the forceable closing of a generally C-shaped bendable wire, and the term "band 41" is defined to mean an annular elongate fastener resulting from the forceable closing of a generally C-shaped bendable strap. Rings 11 of FIGURE 7 are employed to join panels 21 and 22 to the intervening spacers 24, to join cage 10 to rack 9, and to join feed box 69 to door 60. Bands 41 of FIGURE 8 are employed to joint the various screen panels 12, 13, 14, 15, 16, 17, 21, and 22; door latch 65 to door 60; sections 81 and 82; and door 60 to forward panel 17. For purposes of clarity in the drawing, rings 11 and bands 41 are shown in selected representative portions of FIGURES 1–5.

Each dual-panel upright partition 20 comprises a pair of opposed screen panels 21 and 22, each panel member 21 and 22 being substantially equal dimensionally to the rectangular cross-sectional opening formed by panels 12, 13, 16, and 17. Panel members 21 and 22 are substantially parallel and spaced apart a finite distance to prevent animals of adjacent compartments from pawing and biting each other. Conveniently, peripheral edges of panel members 21 and 22 are attached perpendicularly to panels 12, 13, 16, and 17, with appropriate fastener means, as for example with a plurality of bands 41. In order to prevent neighboring animals from bowing screen panels 21 and 22 into contact with each other, a plurality of spacer means 24, herein as small strips of screen panel, are maintained uprightly between panels 21 and 22 with ring fasteners 11 as shown in FIGURE 3.

Each partition 20 is provided with aligned openings through both panel members 21 and 22 to provide an inter-compartment passageway so that the male animal may roam from compartment to compartment for breeding purposes. Normally the female inhabitant of each compartment is provided with a neck collar accessory having a cross-sectional size greater than the cross-sectional size of the inter-compartment passageway to prevent egress of the female animal from her own cage. A substantially horizontal tubular member 23 lines the aligned openings of panel members 21 and 22, said tubular member extending horizontally a finite distance into both adjacent compartments. Tubular liner member 23 is attached in place with suitable attachment means as by welding, looped wires, or as by a tight friction fit with panel members 21 and 22 as shown in FIGURE 2. The longitudinal central axes of the several tubular liners 23 are substantially linearly aligned. In the FIGURE 2 exploded view, one of the partitions 20 is illustrated as being assembled while the other partition nearer to end panel 15 is shown with its components 21–24 in exploded form. Tubular liner member 23 facilitates access to the male animal to the various cages and in particular prevents injury to the reproductive organs when passing from one compartment to the other.

In order to prevent egress of infant chinchillas from the home compartment into the hostile environment of neighboring compartments, a removable sleeve member, e.g., 80, is used to span the longitudinal dimension of any and all compartments having infants therein. While the sleeve member is adaptable for use in the terminal compartments A and C, it is especially desirable for use in an intermediate compartment, e.g. B, because sleeve 80 permits the male access to non-litter compartments, while in the two terminal compartments the conduit member serves only to prevent egress of the infants. As can best be seen in FIGURE 2, the sleeve member 80 preferably comprises two rectangular strips of screen material 81 and 82, said two strips each being formed into semicircular cross sectional shape and the two sections being pivotably joined together, as with a plurality of bands 41. There are closure means to bring the two semicircular sections into a cylindrical tube configuration, as for example with three identical flexible straps of spring steel 83. Each permanently bent but flexible strap of spring steel 83 is pivotally wrapped around a rod portion of semicircular section 82 and the outwardly extending terminal end portion of each strap has a kink or detent portion 86 to securely engage the opposite section 81 about a rod portion and thus maintain a tubular shape for sleeve 80. Sleeve 80 is provided of an open screen material rather than of an imperforate material, e.g. sheet metal, so that there will be a degree of sensual contact through sleeve 80 between the male stud and the new mother, primarily so as to emotionally pacify the mother animal. Further, the screen material is desirably of the non-woven dual-layer type hereinafter described in conjunction with doors 60 with a layer of rods being concentric about the sleeve longitudinal axis so that the male stud may gain a firm footing along the length of sleeve 80.

If sleeve member 80 is to be employed within an intermediate compartment, e.g. B, then it is wrapped around the tubular members 23 of adjacent partitions 20, specifically those portions of tubular members 23 that extend into compartment B. Sleeve member 80 is removably attached into this position surrounding tubular members 23 with suitable closure means, e.g. permanently bent straps 83 having perminently kinked end portions 86. In order to permit secure and removable attachment of sleeve member 80 to tubular member 23, it is essential that the several tubular liners 23 be substantially linearly aligned in a horizontal direction along said chinchilla care cage 10. Further, each tubular liner 23 must be of substantially the same cross-sectional size and shape.

In the two terminal compartments A and C the situation is different because there is but one tubular-liner 23 extending into these compartments. The one available tubular liner 23 is surroundably engaged with sleeve member 80 as in the case of intermediate compartment B. The second end of sleeve 80, nearer to upright end panel 14 or 15, is attached to care cage 10 so that sleeve 80 is substantially parallel to upper and lower panels 12 and 13. As in the case of the panel attachment means, the sleeve 80 can be so attached to cage 10 in a variety of ways. However, the S-shaped clips 88 are preferred for their economy and simplicity of use. The length of sleeve member 80 should not be excessively short and in no event should there be more than a one inch spacial gap between sleeve 80 and end panel 14 or 15 lest the infant animals escape through the said gap. Further, the tubular-liner 23, and accordingly the conduit members 80, should be at least 4-5 inches above lower panel 13 in terminal compartments A and C to prevent escape of the infant chinchillas into the spacial gap at end panels 14 or 15, especially if said gap should exceed about one inch.

Pivotably attached to forward panel 17 across the respective rectangular entrances or openings 17A, 17B, and 17C, are doors 60. Each of said doors 60 is of rectangular shape, and irrespective of the shape of the entrance opening and the door, the door must always exceed the dimensional size of and completely surround the peripheral boundaries of said opening. The curvilinear interior side of door 60 is slightly convex with respect to planar forward panel 17. For reasons which are best illustrated in FIGURES 4 and 5, the open-mesh screen structural material for door 60 and forward panel 17 is preferably of the type comprising two superimposed non-woven layers. Each layer comprises a plurality of substantially parallel rods of circular cross-sectional shape, the rods of one layer being in non-parallel transverse relationship to the other layer, the rods of the two layers being joined together at their mutual cross-over points as by fusion-welding to unify said two layers. The interior layer rods 61 of door 60 and the exterior layer rods 18 of forward panel 17 are in non-parallel abuttable relationship. As can best be seen in FIGURE 5, a plurality of bands 41 joins interior rods 61 of door 60 to the interiors rods 19 of panel 17 with sufficient pressure to actually bow rods 61 inwardly toward panel 17. This bowed configuration of rods 61 tends to keep door 60 at least partially ajar unless latch 65 is engaged with forward panel 17, thus providing a warning when latch 65 is not securely locked into place. Latch 65 may be provided of a one-piece rod including a looped intermediate portion 67 to springably mount terminal portion 66 with respect to door 60. Latch 65 is substantially coplanar with door 60, except for the terminal portion 66 that extends beyond door 60 remote of its pivotal connection. Latch terminal portion 66 is of a C-shaped configuration which facilitates locking engagement with a rod of forward panel 17. C-shaped portion 66 is substantially perpendicular to door 60, and will lock door 60 into substantial parallelism with forward panel 17. As an optional feature, door 60 may be provided with an integral feed box 69 attached to said door 60 with rings 11. As an another optional feature, panel 17 includes a liquid feeding bottle 68.

A record keeping device 70 comprising a plurality of pivotal record cards disposed in imbricate relationship is an optional feature of this invention. There are at least as many record cards as there are compartments, at least one record card being devoted to every animal. For convenience in illustration, five record cards are shown herein. The base member 71 of record keeping device 70 has a flanged rearwardly extending portion 72 so that device 70 may be attached in a fixed spatial relationship with respect to cage 10, as for example to rack shelves 9a and/or 9b.

From the foregoing, the construction and operation of the chinchilla care cage will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. A multi-compartment cage for the care and polygamous breeding of chinchillas and the like, said multi-compartment cage being of the type adapted to be horizontally supported as within a rack having a plurality of vertically aligned shelves whereby a plurality of vertically aligned chinchilla cages may be horizontally supported by said rack, said multi-compartment chinchilla care cage having an elongate box-like configuration and comprising a plurality of screen panels joined together including vertically aligned conterminous upper and lower elongate horizontal panels, a pair of opposed upright end panels, opposed upright forward and rearward panels coextensive in longitudinal length between the upright end panels, and a plurality of upright dual-panel partitions rigidly spaced at intervals along and between the upper and lower panels to provide a plurality of horizontally aligned compartments within said cage, said upright forward panel having a plurality of entrance-openings to provide an attendant's entrance into each said compartment, each of said dual-panel partitions being provided with an opening in the longitudinal direction through both panels with a liner means disposed within the opening to provide a continuous horizontal longitudinal inter-compartments passageway means for the dual-panel partitions between the several said compartments whereby a male chinchilla traveling horizontally between the upright end panels must traverse each of the cage compartments, and a plurality of door members attached to the forward panel, said door members being adapted to close the several entrance-openings for the several cage compartments.

2. The multi-compartment chinchilla care cage of claim 1 wherein a tubular liner member is disposed within each inter-compartment passageway and is attached to the dual-panel partition, the tubular liner of each dual-panel partition extending into both adjacent compartments, the longitudinal central axes of the several tubular liners being substantially linearly aligned in a horizontal direction along said chinchilla care cage, and wherein an elongate sleeve member is longitudinally positioned across at least one cage compartment normally to the dual-panel partition, said sleeve member surrounding and being removably attached to at least one of said tubular liners.

3. The multi-compartment chinchilla care cage of claim 1 wherein the structural material of the forward panel and the door members comprise an open mesh screen having two superimposed non-woven layers each layer comprising a plurality of substantially parallel rods of circular cross-sectional shape, the rods of one layer being is non-parallel relationship to the other layer, the rods of the two layers being joined together at their mutual cross-over points to unify said two layers, and wherein the interior layer rods of said door are in non-parallel relationship to the exterior layer rods of the upright forward panel.

4. The multi-compartment chinchilla care cage of claim 3 wherein peripheral upright rods of the door and upright forward panel are tightly secured together with fastener rings whereby the upright rods of the door member are bowed toward the forward panel so as to tend to maintain the door member partially ajar oblique relationship with respect to the upright forward panel, and wherein said door member includes a rod-like latch member the intermediate portion of which includes a looped portion, said latch member intermediate portion being substantially parallel to the door member and to the cage lower panel, said latch member including a C-shaped terminal portion normal to the latch intermediate portion, said terminal portion being positioned beyond the confines of the door member remote of its pivotal connection, said C-shaped terminal portion being adapted to engage a forward panel rod to maintain the door in substantial parallelism with the forward panel.

5. The multi-compartment chinchilla care cage of claim 4 wherein a tubular liner member is disposed within each inter-compartment passageway and is attached to the dual-panel partition, the tubular liner of each dual-panel partition extending into both adjacent compartments, the longitudinal central axes of the several tubular liners being substantially linearly aligned in a horizontal direction along said chinchilla care cage, and wherein an elongate sleeve member is longitudinally positioned across at least one cage compartment normally to the dual-panel partition, said sleeve member surrounding and being removably attached to at least one of said tubular liners.

6. The multi-compartment chinchilla care cage of claim 2 wherein the structural material of the sleeve member comprises an open mesh screen having two superimposed non-woven layers each layer comprising a plurality of substantially parallel rods of circular cross sectional shape, the rods of one layer being in non-parallel transverse relationship to the other layer, the rods of the two layers being joined together at their mutual cross-over points to unify said two layers, two elongate strips of said open mesh screen having a uniform semicircular cross-sectional shape being pivotably joined together, said two strips being attached together in tubular form with a plurality of bendable straps attached along an elongate dimension of one of said strips to provide the sleeve member, and a layer of rods for said sleeve member being concentric about the sleeve longitudinal axis.

7. The multi-compartment chinchilla care cage of claim 6 wherein the upper panel and said upright end panels are provided of a single unitary rectangular strip of open mesh screen, equal length terminal portions being bent perpendicularly downwardly of the longer intermediate portion to provide the upright end panels; wherein the lower panel and said upright forward and rearward panels are provided of a single unitary rectangular strip of open mesh screen, equal length terminal portions being bent perpendicularly upwardly of the intermediate portion to provide the upright forward and rearward panels; wherein a plurality of screen strip spacer means are attached between the respective panels of the dual-panel partition; wherein the structural material of the sleeve member comprises an open mesh screen having two superimposed non-woven layers each layer comprising a plurality of substantially parallel rods of circular cross-sectional shape, the rods of one layer being in non-parallel transverse relationship to the other layer, the rods of the two layers being joined together at their mutual cross-over points to unify said two layers, two elongate strips of said open mesh screen having a uniform semicircular cross-sectional shape being pivotably joined together, said two strips being attached together in tubular form with a plurality of bendable straps attached along an elongate dimension of one of said strips to provide the sleeve member, and a layer of rods for said sleeve member being concentric about the sleeve longitudinal axis; and wherein there is a record keeping means attached in fixed spacial relationship with respect to said chinchilla care cage, said record keeping means comprising a plurality of pivotal record cards disposed in overlying imbricate relationship, there being at least as many record cards as there are compartments in the elongate chinchilla care cage.

8. A multi-compartment chinchilla cage for the care and polygamous breeding of chinchillas and the like, said multi-compartment cage being of the type adapted to be horizontally supported, said multi-compartment chinchilla care cage having an elongate box-like configuration and comprising a plurality of panels joined together including vertically aligned upper and lower elongate horizontal panels, a pair of opposed upright end panels, opposed upright forward and rearward panels coextensive in longitudinal length between the upright end panels, and a plurality of upright dual-panel partitions rigidly spaced at intervals along and between the upper and lower panels to provide a plurality of horizontally aligned compartments within said cage, said upright forward panel having a plurality of entrance-openings and doors associated therewith to provide a closeable attendant's entrance into each said compartment, each of said upright dual-panel partitions being provided with an opening in the longitudinal direction, a horizontal tubular liner member disposed within the central opening of each upright dual-panel partitions said tubular liners extending in the longitudinal direction, said tubular liners providing a continuous horizontal longitudinal inter-compartments passageway means for the dual-partitions between the several said compartments whereby a male chinchilla traveling horizontally between the upright end panels must traverse each of the said tubular liners and cage compartments.

9. The multi-compartment chinchilla care cage of claim 8 wherein the said upright partitions comprise a pair of centrally open screen panels spaced apart a finite distance, the central opening of both screen panels being horizontally aligned; wherein each tubular liner is disposed within the aligned central openings of each dual-panel upright partition and extends longitudinally into both compartments located on either side of said dual-panel upright partition; and wherein an elongate sleeve member is longitudinally positioned across at least one cage compartment, said sleeve member surrounding and being removably attached to at least one of said tubular liners.

References Cited

UNITED STATES PATENTS

| | | | |
|---|---|---|---|
| 1,347,397 | 7/1920 | Newman | 119—17 |
| 2,262,441 | 11/1941 | Frederic | 119—18 X |
| 2,713,323 | 7/1955 | Marsh | 119—17 |
| 2,725,036 | 11/1955 | Petrie | 119—17 |
| 2,822,780 | 2/1958 | Buell | 119—17 |
| 3,062,183 | 11/1962 | Tate | 119—15 |
| 3,254,627 | 6/1966 | Cross | 119—17 |

HUGH R. CHAMBLEE, *Primary Examiner.*